US012775778B2

(12) United States Patent
Robert Jose et al.

(10) Patent No.: US 12,775,778 B2
(45) Date of Patent: Oct. 27, 2026

(54) METHODS AND SYSTEM FOR PARAPHRASING COMMUNICATIONS

(71) Applicant: Adeia Guides Inc., San Jose, CA (US)

(72) Inventors: Jeffry Copps Robert Jose, Chennai (IN); Lakshay Sagar Rana, Chandigarh (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/942,504

(22) Filed: Sep. 12, 2022

(65) Prior Publication Data

US 2024/0086622 A1 Mar. 14, 2024

(51) Int. Cl.
*G06F 40/166* (2020.01)
*G06F 40/247* (2020.01)
*G06F 40/30* (2020.01)

(52) U.S. Cl.
CPC .......... *G06F 40/166* (2020.01); *G06F 40/247* (2020.01); *G06F 40/30* (2020.01)

(58) Field of Classification Search
CPC ...... G06F 40/116; G06F 40/247; G06F 40/30; G06F 40/166; G06F 40/56
See application file for complete search history.

(56) References Cited

U.S. PATENT DOCUMENTS 9,386,110 B2 * 7/2016 Cudak ................. G06F 16/9535
10,594,757 B1 * 3/2020 Shevchenko ........... G06F 17/18
11,398,218 B1 * 7/2022 Haslam ................... G10L 13/00
2006/0129927 A1 * 6/2006 Matsukawa .......... G06Q 10/107 715/275
2006/0293876 A1 * 12/2006 Kamatani ............... G06F 40/40 704/2
2007/0245245 A1 * 10/2007 Blue ..................... G06F 16/904 707/E17.108
2008/0059570 A1 * 3/2008 Bill ......................... G06F 40/58 709/203
2009/0119090 A1 * 5/2009 Niu ....................... G06F 40/247 704/1
2010/0223581 A1 * 9/2010 Manolescu ............ G06Q 10/10 707/E17.046
2013/0339849 A1 * 12/2013 Mebed ................ G06Q 10/107 715/273

(Continued)

OTHER PUBLICATIONS

Cheol et al., "System and Method for Constructing Emotion Lexicon by Paraphrasing and Recognizing Emotion Frames", published on Mar. 5, 2019, Document ID No. KR-20190021015-A, p. 8. (Year: 2019).*

*Primary Examiner* — Chau T Nguyen
(74) *Attorney, Agent, or Firm* — HG Law

(57) ABSTRACT

Systems and methods for paraphrasing communications are disclosed. A first communication input is received and a context of the first communication input is determined. Based on the context of the first communication input, a plurality of linguistic elements are selected and a plurality of paraphrasing pairs are identified, each pair having one of the plurality of linguistic elements and a paraphrasing candidate of the linguistic element. The paraphrasing candidate is based on an emotional state of a sender of the first communication input and at least one of the plurality of paraphrasing pairs are displayed to the sender for selection.

18 Claims, 7 Drawing Sheets

(56) References Cited

U.S. PATENT DOCUMENTS

| | | | | |
|---|---|---|---|---|
| 2014/0344687 | A1* | 11/2014 | Durham | G06F 3/04883 715/716 |
| 2015/0264146 | A1* | 9/2015 | Cudak | G06F 16/9535 709/204 |
| 2016/0378965 | A1* | 12/2016 | Choe | G06F 1/1626 726/19 |
| 2017/0041264 | A1* | 2/2017 | Khomami Abadi | A61B 5/165 |
| 2017/0052949 | A1* | 2/2017 | Baldwin | H04L 51/216 |
| 2017/0366627 | A1* | 12/2017 | Chan | H04L 67/12 |
| 2019/0288973 | A1* | 9/2019 | Liu | H04L 51/18 |
| 2020/0053035 | A1* | 2/2020 | Mukherjee | G06F 40/30 |
| 2021/0194985 | A1* | 6/2021 | Gilbert | G06N 20/10 |
| 2021/0358488 | A1* | 11/2021 | Iyer | G10L 25/90 |
| 2023/0421518 | A1* | 12/2023 | Pandey | H04L 51/42 |

* cited by examiner

100

| Word | AFRAID | AMUSED | ANGRY | ANNOYED | DONT_CARE | HAPPY | INSPIRED | SAD |
|---|---|---|---|---|---|---|---|---|
| awe#n | 0.08 | 0.12 | 0.04 | 0.11 | 0.07 | 0.15 | **0.38** | 0.05 |
| comical#a | 0.02 | **0.51** | 0.04 | 0.05 | 0.12 | 0.17 | 0.03 | 0.06 |
| crime#n | 0.11 | 0.10 | **0.23** | 0.15 | 0.07 | 0.09 | 0.09 | 0.15 |
| criminal#a | 0.12 | 0.10 | **0.25** | 0.14 | 0.10 | 0.11 | 0.07 | 0.11 |
| dead#a | 0.17 | 0.07 | 0.17 | 0.07 | 0.07 | 0.05 | 0.05 | **0.35** |
| funny#a | 0.04 | **0.29** | 0.04 | 0.11 | 0.16 | 0.13 | 0.15 | 0.08 |
| future#n | 0.09 | 0.12 | 0.09 | 0.12 | 0.13 | 0.13 | **0.21** | 0.10 |
| game#n | 0.06 | 0.15 | 0.06 | 0.08 | 0.15 | **0.23** | 0.15 | 0.12 |
| kill#v | **0.23** | 0.06 | **0.21** | 0.07 | 0.05 | 0.06 | 0.05 | **0.27** |
| rapist#n | 0.02 | 0.07 | **0.46** | 0.07 | 0.08 | 0.16 | 0.03 | 0.12 |
| sad#a | 0.06 | 0.12 | 0.09 | 0.14 | 0.13 | 0.07 | 0.15 | **0.24** |
| warning#n | **0.44** | 0.06 | 0.09 | 0.09 | 0.06 | 0.06 | 0.04 | 0.16 |

150

METHODS AND SYSTEM FOR PARAPHRASING COMMUNICATIONS

BACKGROUND

The present disclosure relates to systems for paraphrasing communications and, more particularly, to systems and related processes for paraphrasing communications based on an emotional context of the communication, the sender, and/or the recipient of the communication.

SUMMARY

In the field of natural language processing, there are known challenges that are associated with paraphrasing a user's speech or written language. For example, in the field of machine translation wherein a computer converts text (e.g., a written sentence) inputted by a user to a different language, without changing the content of the text, or understanding the context of the text has proven challenging. Existing tools can summarize or paraphrase a word document such that the output is a shorter version of the original document. For example, word processors have had "Auto Summarize" functionality, "rewrite" and "synonym" features that allow users to find alternative expressions while drafting. Some existing tools and technologies are focused on paraphrasing—i.e., rewriting the text in a variety of ways while maintaining the original intended meaning. Such tools also offer to paraphrase in various modes (e.g., fluency, formal, simple, creative, etc.) Additionally, some tools are used to detect plagiarism by comparing two text documents, common in higher education institutions.

However, paraphrasing techniques have yet to be applied while considering the emotional sentiment and context of a communication between two or more users. In particular, the emotional state of the sender, the emotional state of the recipient(s), and the relationship between the sender and the recipient(s) (e.g., colleagues, family, friends, etc.) and using this information to form paraphrasing suggestions to the sender, which can be selected to improve the tone, context, emotional sentiment, or emotional receptions of the communication. Several lexica for sentiment analysis have been developed and made available in the natural language processing community. For example, The DepecheMood model, by Jacopo Staiano and Marco Guerini developed in 2014 (Depechemood: a lexicon for emotion analysis from crowd-annotated news. In Proceedings of the 52nd Annual Meeting of the Association for Computational Linguistics (ACL), pages 427-433), and improvements thereafter.

In a first approach, there is provided a method for paraphrasing communications, the method comprising: receiving a first communication input; determining a context of the first communication input; and based on the context of the first communication input: selecting a plurality of linguistic elements from the first communication input; identifying a plurality of paraphrasing pairs of the first communication input, each pair having one of the plurality of linguistic elements and a paraphrasing candidate of the linguistic element; and displaying, for selection by the user (e.g., a sender or recipient), at least one of the plurality of paraphrasing pairs.

In some examples, the method further comprises determining the emotional state of a user (e.g., a sender or recipient). In some examples, the paraphrasing candidate is based on an emotional state of a user (e.g., a sender or recipient of a message) of the first communication input. In some examples, determining the emotional state of the user (e.g., a sender or recipient) is based on at least one of; facial analysis, audio analysis, computer vision, heart rate analysis, or analysis of language in the first communication. For example, the emotional state of the sender may be determined by facial analysis of the user through a front-facing camera in a user device such as a smartphone or laptop. Similarly, computer vision may be applied to an image or frames of a user to determine their mood or emotional state based on postures or body language. In another example, heart-rate analysis has been shown to be indicative of a user's mood or emotional state, which when combined with a context of location or action, can indicate abnormal mood(s). Furthermore, the language that a user chooses when typing, speaking, or the like, can also be reflective of their emotional state, this can be analyzed by using natural language processing, or the like.

In some examples, determining the emotional state of a user (e.g., a sender or recipient) is carried out in response to a trigger. In some examples, the trigger may be one of; a timer, an action of the user (e.g., a sender or recipient), opening an application on a user device, replying to previous communications, or an increase in heart rate. For example, a sender may open an application on their smartphone (such as a messaging, email, or social media application), which can be used as a trigger for determining the emotional state of the sender. Likewise, a recipient may receive an email from the sender and reply sometime later, the trigger would be the time of the replying rather than the time of the receiving of the email. In a further example, the sender may carry out an action, such as recording a voice memo, video, taking a selfie, or the like—which are not themselves a message in the conventional sense, can be sent to convey a message to another. That is to say that, any action, which in some way can be related to a message, e.g., a verbal, written, or recorded communication sent to or left for a recipient.

In some examples, determining the emotional state of the user comprises identifying a user device with the most recent data for determining the emotional state of the user. For example, the user may have a plurality of devices, such as a smartwatch, smartphone, laptop, and the like; each configured to collect data on the user, which can be used to determine the emotional state of the user. In a particular example, the user may have a smartwatch with heart rate data that is 2 minutes old and smartphone data (e.g., facial analysis data) that is 30 seconds old, therefore the system can use the most recent data for the determination, in response to a trigger as described above. In some examples, the method further comprises determining the emotional state of the user with data from two or more user devices. For example, using a plurality of data points from two or more devices, such as a heart rate from a smartwatch and a facial analysis from a smartphone, the system may determine the emotional state of the user, leading to a more accurate determination.

In some examples, the method further comprises reprocessing data stored on the user device prior to receiving the first communication input, wherein the data was not previously processed for determining the emotional state of the user. Many of the devices available to users record data beyond what is required. For example, a smartwatch records heart rate data for exercise but can also check the data for atrial fibrillation (AFib), a form of irregular heart rhythm, indeed such processing is often carried out after the fact. Accordingly, for example, data previously stored and captured on the user devices can be reprocessed for determining the emotional state of the sender or recipient.

In some examples, the paraphrasing candidate is an emotional synonym or an emotional antonym. An emotional synonym is a phrase used to represent a word or words that convey the same meaning or feeling of the message, but better suits the context in which the user is drafting. For example, the phrase, “Sorry, Bob is sick today” may be suitable for an informal conversation between friends, but at the workplace the phrase, “Apologies, Bob is unwell” might be more suitable, note the latter is also more concise, dropping the term, “today” which may also be more appropriate given the context. An emotional antonym is a phrase used to represent a word or words that improve the sentiment or feeling of the message. For example, the phrase, “you here yet?” may be misconstrued as rude or short over a text message, whereas “hey, where are you?” improves the emotional sentiment of the message, notably by improving the grammar but also by adding the informal greeting, “hey”.

In some examples, determining the context of the first communication comprises calculating a relationship strength score between the sender and a recipient. Moreover, in some examples, the relationship strength score can be calculated by extracting relationship data between the sender and the recipient from at least one of: contact information, stored on a user device; a social network profile link; or previous communications.

In some examples, calculating the relationship strength score may further comprise summing the scores assigned to one or more factors of communication between the sender and the recipient; and assigning a score to one or more of: the communication method of the first communication input; the language of the first communication input; the periodicity of one or more previous communications; the communication method of one or more previous communications; and the language of one or more previous communications.

In some examples, determining the context of the first communication comprises calculating an emotional connection score between the sender and a recipient. Calculating the emotional connection score may further comprise summing the scores assigned to one or more factors of communication between the sender and the recipient; and assigning a score to one or more of: the communication method of the first communication input; the language of the first communication input; the periodicity of one or more previous communications; the communication method of one or more previous communications; and the language of one or more previous communications.

In some examples, the paraphrasing candidate is further based on an emotional state of a recipient of the first communication input. E.g., the emotional score of the recipient is used to determine if the communication is something that would potentially adversely affect the emotional state of the recipient. In this way, more positive language can be suggested to improve or prevent harm to the recipients emotional state.

In another approach, there is provided a non-transitory computer-readable medium, having instructions stored thereon for paraphrasing communications which, when executed, carry out a method, the method comprising: receiving a first communication input; determining a context of the first communication input; and based on the context of the first communication input: selecting a plurality of linguistic elements from the first communication input; identifying a plurality of paraphrasing pairs of the first communication input, each pair having one of the plurality of linguistic elements and a paraphrasing candidate of the linguistic element; and displaying, for selection by the sender, at least one of the plurality of paraphrasing pairs.

In another approach, there is provided a device for paragraphing communications comprising a control module, a transceiver module and a network module, configured to: receive a first communication input; determine a context of the first communication input; and based on the context of the first communication input: select a plurality of linguistic elements from the first communication input; identify a plurality of paraphrasing pairs of the first communication input, each pair having one of the plurality of linguistic elements and a paraphrasing candidate of the linguistic element; and display, for selection by the sender, at least one of the plurality of paraphrasing pairs.

In another approach, there is provided a system for paraphrasing communications, the system comprising: means for receiving a first communication input; means for determining a context of the first communication input; and based on the context of the first communication input: means for selecting a plurality of linguistic elements from the first communication input; means for identifying a plurality of paraphrasing pairs of the first communication input, each pair having one of the plurality of linguistic elements and a paraphrasing candidate of the linguistic element, wherein the paraphrasing candidate is based on an emotional state of a sender of the first communication input; and means for displaying, for selection by the sender, at least one of the plurality of paraphrasing pairs.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
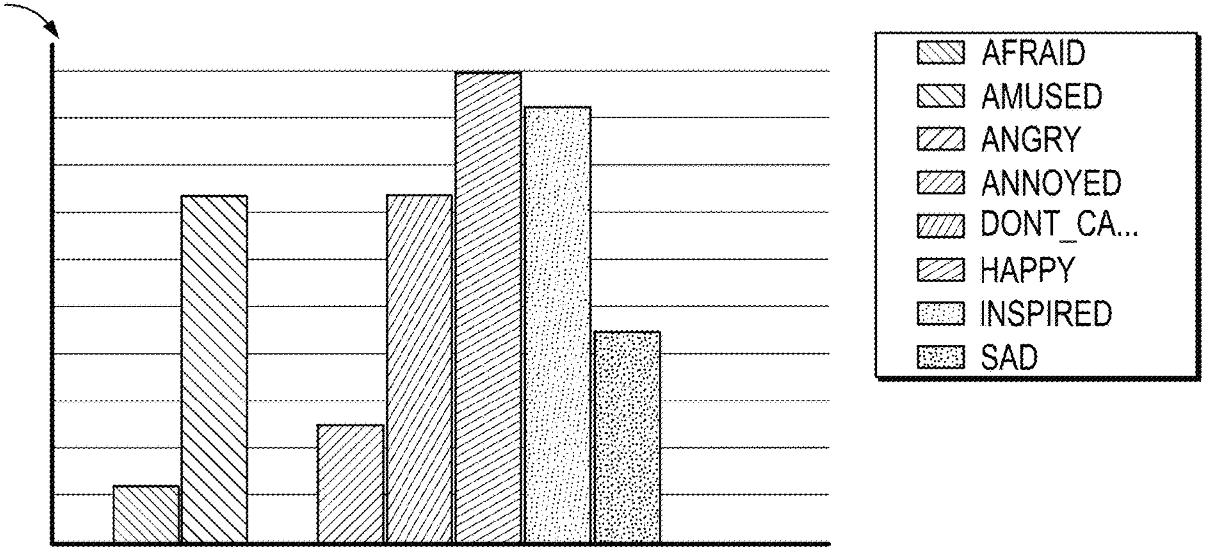
FIG. 1 shows a representation of the mood extracted from an input sentence and word emotional score using an algorithm from the art.

Paraphrasing used in a computerized environment is a process of automatically generating a paraphrasing sentence from a reference sentence or an input sentence. Often, computer-generated paraphrases are alternative ways of conveying the same information, i.e., the context of the sentence is not changed, but the words, clauses, and phraseology—collectively referred to as linguistic elements—are often changed. Paraphrasing is an important natural language processing task that is targeted at rephrasing the same statement in many different ways, sometimes to improve the statement's readability or to address a specific audience. For example, the phrase “Joel wrote the book” uses simple language, understandable by children or those with novice language skills, that can be paraphrased to “Joel is the author of the book”. Applications of paraphrasing include, but are not limited to, information retrieval, information extraction, question answering, and machine translation. For example, in the automatic evaluation of machine translation, paraphrasing may help to alleviate problems presented by the fact that there are often alternative and equally valid ways of translating a text. In question answering, discovering paraphrased answers may provide additional evidence that an answer is correct.

In the present disclosure, paraphrasing sentences based on the context of the input communication, and the emotional state of the user (e.g., sender) are disclosed. In addition, the emotional state of the recipient, the relationship between the sender and the recipient(s) (e.g., colleagues, family, friends, etc.) and the emotional relation between the sender and the recipient(s). In particular, paraphrasing is carried out based on an emotions communication score, relationship strength score, and current emotional state of the sender and/or recipient to interrupt messages being sent, postpone messages to be sent at a different time, suggest emotional synonyms or emotional antonyms of words, and the like.

When suggesting paraphrasing to a user for a communication being composed to a recipient, the relationship between the user (i.e., the sender) and the recipient can highly influence the paraphrasing suggestion. For example, a user drafting a message to a childhood friend may have a completely different emotional sentiment to a work colleague. Calculating a relationship score, an arbitrary representation of how close two individuals are, and using that information is an appropriate way to provide a more accurate paraphrasing suggestion. Information for calculating a relationship strength score can be extracted from the contact information on a device (e.g., mom, dad, etc.); social network profile links (e.g., friends, close friends, interactions on the platform, pictures together, tags, likes on each other profile etc.); and periodicity of communications (e.g., phone calls, texts, content sharing etc.) are examples of factors that can influence a relationship score. In addition, lower or higher scores can be assigned based on communication medium (e.g., communications by email only may represent a low relationship score, whereas communications by messaging applications and long phone calls may represent a high relationship score.)

A user device, such as a smartphone, personal computer, or IoT device, can subscribe to a plurality of services (e.g., web services, applications, keyboards, etc.), such as a paraphrasing module that can implement the paraphrasing techniques disclosed herein, although other ways of implementing the presently disclosed techniques will be apparent to one skilled in the art. Such user devices also, often, measure a plurality of data points that are only processed for a particular purpose. For example, current smartphones may take images of the user's face to authenticate the user to unlock the smartphone. Reprocessing (or parallel processing) such data for the purpose of detecting the emotional state of user allows the emotional state of the user to be monitored for not only when drafting text or speech, but also for receiving text or speech from another user. Paraphrasing modules can access this data via, for example, an Application Programming Interface (API) to maintain security of the data being stored locally on the user's device.

Often, a user has access to more than one device at any given time. For example, the user may be checking their smartphone, while wearing a smartwatch, at their personal computer or laptop. Accordingly, dynamically and intelligently using the right device to determine the emotion of the user is also of importance. For example, attempting to use facial recognition while the user is checking their smartwatch may prove ineffective. Conversely, using old data points (e.g., greater than 5 minutes) from heartrate data or facial images may also be ineffective. In some examples, a combination of data points from one or more devices can be used to determine the emotion of the user.

FIG. 1 shows a representation of the mood extracted from an input sentence and word emotional score using an algorithm from the art. Currently, there are various ways to detect or predict the user's emotional state. The present disclosure does not introduce a novel technology for measuring a user's emotional state, per se, instead existing technologies to determine the user's emotional state are preferred. In this way, the current teachings can be applied to the latest technologies for determining the user's emotional state, even those yet to be developed. It is the use of the data that is key and presently used in a novel way, by creating and updating (e.g., over time) an emotions communication score between two entities (e.g., two people) that communicate via various means (e.g., iMessage, WhatsApp, Instagram, FaceTime, or other video/audio communication applications, etc.), which will be explained in more detail below.

Traditionally, lexicon acquisition and emotion determination of the language acquired can be done in two distinct ways: either manual creation (e.g. crowdsourcing annotation) or automatic derivation from already annotated corpora. While the former approach provides a more precise lexica, the latter usually grants a higher coverage. Regardless of the approach chosen, when used as baselines or as additional features for learning models, lexica are often “taken for granted”, meaning that the performances against which a proposed model is evaluated are rather weak, a fact that could be arguably seen to slow down progress in the field. In the present disclosure, simple and computationally cheap techniques (e.g. document filtering, text pre-processing, frequency cut-off) are preferred.

One such simple and computationally cheap technique is DepecheMood++(DM++), an extension of the DepecheMood lexicon established in 2014, which has been extensively used by the research community and has demonstrated high performance even in domain-specific tasks, often outperformed only by domain-specific lexica/systems; DM++ has substantive emotion lexica that have been validated and optimized, so is the preferred model in this disclosure, however, the skilled person will appreciate other model and techniques are available.

FIG. 1 shows in table 100 an excerpt of the final matrix of the English language words and their dominant emotion using DM++. Lexica such as this can be interpreted as a list of words with scores that represent how much weight a given word has in the affective dimensions considered. So, for example, awe #n has a predominant weight in INSPIRED (0.38), comical #a has a predominant weight in AMUSED (0.51), while kill #v has a predominant weight in AFRAID, ANGRY and SAD (0.23, 0.21 and 0.27 respectively). Inputting a sentence or a phrase into DM++ results in a distribution of emotions in the sentence or phrase. Two tasks are performed; a regression task, providing cumulative values of the weighting of emotions, and a classification task that labels the input text with its dominant emotions. For example, an example of headline from the dataset is the following: "Iraq car bombings kill 22 People, wound more than 60". For the regression task the values provided are: <anger(0.32), disgust(0.27), fear(0.84), joy(0.0), sadness (0.95), surprise(0.20)> while for the classification task the labels provided are {FEAR, SADNESS}.

Figure 2:
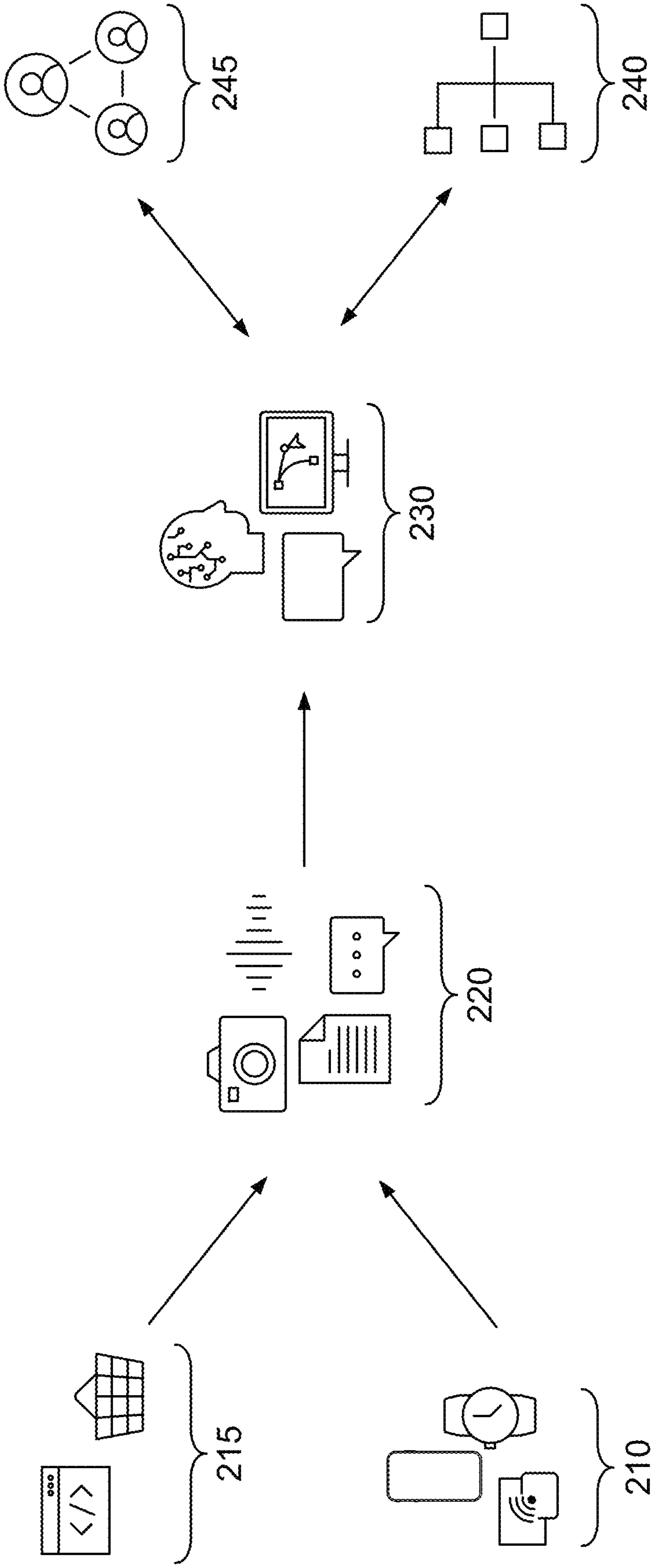
FIG. 2 is a graphical representation of data sources and data outputs, in accordance with some embodiments of the disclosure.

FIG. 2 is a graphical representation of data sources and data outputs, in accordance with some embodiments of the disclosure. The user's devices 210 and their interactions with web services 215 can be utilized to extract the raw data 220 to be analysed by models 230 (e.g., DM++) to create outputs that can be utilized to determine relationships between users 245 (e.g., sender and receiver), and paraphrasing candidates 240 to improve the emotional score for the raw data input 220. For example, an image of the subject can be acquired, processed and important facial features/visual properties are extracted with a CNN model to perform emotion classification. An example of such technology is DeepFace. Similarly, physical properties of the voice (e.g., pitch, tone, speed, etc.) can be used to identify emotions (e.g., Empathy).

The user's devices 210 may also include devices with cameras and computer vision can then be used to track posture, gestures, and expressions. Some research suggests that electrocardiography (ECG) which analyzes heart activity can be used to also determine the subject's emotional state. There are other existing techniques for determining the emotional state of a person including galvanic skin response, heart rate variability, etc. Today, consumer devices such as smartphones and smart wearables (e.g., watches) already offer some of these capabilities—for example, the Apple Watch includes built-in electrodes in the Digital Crown and the back of the Apple Watch. This allows the user to take an ECG and record the heart rate and rhythm using the onboard electrical heart sensor. The user devices 210 may also include a plurality of internet of things (IoT) devices, for example, smart doorbells (e.g., for facial and posture recognition), home assistants (e.g., for voice recognition), security cameras (e.g., for facial and posture recognition), baby monitoring devices, and the like.

The web services 215 may comprise the user's internet history, eCommerce sites, social media and messaging platforms (e.g., iMessage, WhatsApp, Instagram, FaceTime, or other video/audio communication applications, etc.), the advertisements the user interacts with or watches fully, and the media they consume on OTT platforms. An API may be used to access such information from the user devices 210 and the web services 215, and pull out the raw data 220.

Models 230 take the raw data 220 and use emotion recognition and classification techniques to determine the emotion of the raw data 220. Context of the raw data 220 should also be provided. For example, if the models are fed an email to determine emotion, that context is important as the email will likely require paraphrasing live. However, facial data from a doorbell as the user arrives home from work is useful to determine an emotional data point, but may not require immediate action. Context may also be provided in the form of the user's network 245, that is to say, whomever the user is communicating with at any particular time and their relationship. If no relationship data can be found between the user and the recipient, then the default position is to suggest paraphrasing that creates formal language. In some examples, the default position is configurable to provide different emotive language by default, such as happy and/or informal, or a combination thereof.

Models 230 take into account the raw data 223, the user and their network 245 and the paraphrasing candidates 240 to identify linguistic elements in a communication input and suggest improvements, alternatives, substitutions, additions, and/or deletions to the communication. In some examples, an automatic emotion recognition (AER) is periodically performed based on available devices 210. The attribute analysis results from model 230 are made available to applications that the user authorizes access to. For example, an emotion score is determined periodically, or actions can trigger the user collection of data to update the emotion score. For example, an action such as a sudden change of the user's heart rate (e.g., if a user is wearing a smartwatch with sensors capable of performing such measurement). All scores are associated with a time, so models 230 are aware of how recent such data/measurements are. Models might use existing data if it is recent (based on the time associated with the measurement) or can trigger data collection/emotion analysis. Such web services can request how the data is collected; for example, a web service might rely on facial analysis in which a frame of the user is captured and analyzed. Another service might request analysis of the audio in the environment in which case an audio snippet is captured and analyzed.

In some examples, the technologies available at any given time for collecting data to determine the user's emotional state are available to an application or program on a user's device 210. For example, the user might be using his smartwatch to compose a message and therefore it might be challenging to determine the user's current emotional state by analyzing the user's facial features (e.g., capturing a frame of the user's face for feature analysis). A user-agent request header can be used to identify the application, OS, etc. Similarly, a user might be using his or her phone but is also wearing a smartwatch, and therefore, such info would be available to the app. For example, the app might prefer to use recent emotional data and correlate that with a new measurement of the user's heart rate. The app may then request to see if the communication being composed is appropriate (i.e., within a threshold) based on the user's emotion and the relationship between the user and the recipient. More examples are given with regard to the description of FIG. 4.

Figure 3:
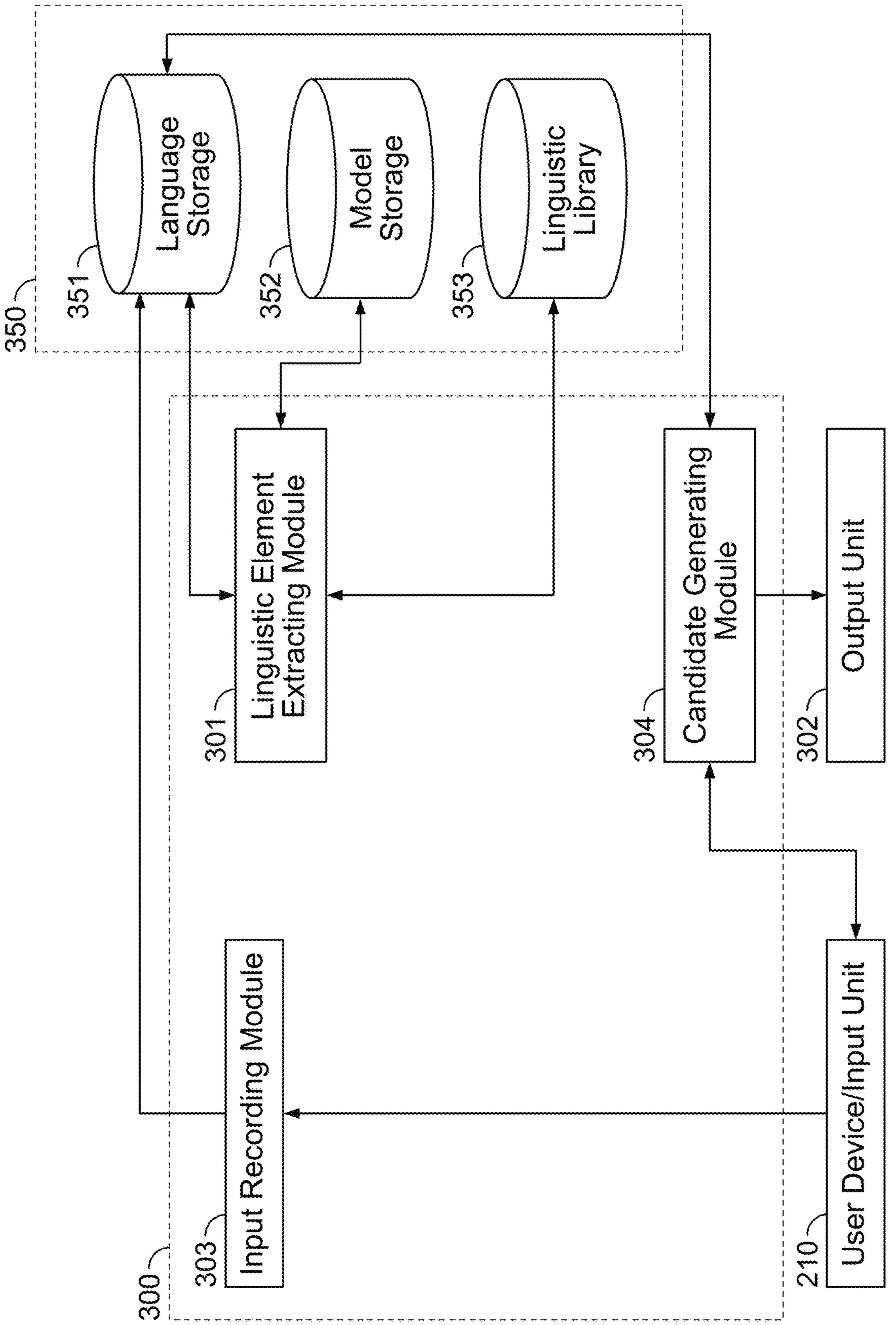
FIG. 3 illustrates an exemplary data processing device, in accordance with some embodiments of the disclosure.

FIG. 3 illustrates an exemplary paraphrasing module 300, in accordance with some embodiments of the disclosure. The paraphrasing module 300 includes linguistics element extracting module 301, input recording module 303, and candidate generating module 304. The paraphrasing nodule 300 is realized, for example, by a CPU and peripheral circuits, for example, the device(s) of FIG. 6 and FIG. 7. The paraphrasing module 300 operates by program control and generates the paraphrase candidates for communications to the input unit 210.

The linguistics element extracting module 301 has a function of judging whether or not each text (e.g., a sentence, phrase, clause or the like) has a paraphrase text (e.g., a sentence, phrase, clause or the like), with regard to texts stored in the storage 350 described below. Specifically, the linguistics element extracting module 301 judges, for all text in the communication stored in language storage 351 by the input recording module 303, Whether or not there is a paraphrase text pair using a model stored in model storage 352. For example, in a case where the communication includes one sentence, one linguistic element in the communication may be extracted based on a model identifying a word as [THREAT:0.31] that has a paraphrase that has less threat but would convey the same message. The linguistics element extracting module 301 has a linguistic library unit storage 353 it can access as a resource for synonyms and antonyms. Moreover, in some examples, the linguistic element extracting module 301 can check possible synonyms and antonyms with a model in model storage to see how replacement words would improve the score of the main emotion word. Thus improving the motions score of the communication. All results are stored in the language storage 351.

As briefly mentioned above, models in model storage 352 have a function of using the linguistic elements extracted by the linguistic element extracting module 301 and stored in language storage and/or passed directly to it as words to try in the communication input by the user to assess the mood of the communication and determine, based on a relationship score of the user and the recipient, whether the communication would improve and in what mood or category.

The input recording module 303 has a function of updating information input by the user using input unit 210 into the language storage 351. Specifically, the input recording module 303 stores the first communication inputted to the input unit 210, in the language storage 351, as it is input so that the linguistic element extracting module 301 can be activated and get to work identifying paraphrases to linguistic elements, which in turn allows models in model storage to assess the change in mood from the original inputted communication to the paraphrase suggestions. Furthermore, the input recording module 303 has the function of updating a communication in the language storage 351 according to further inputs inputted to the input unit 210.

The candidate generating module 304 has a function of generating a paraphrase candidate or candidates, with respect to the communication inputted to the input unit 210, and outputting the highest improvement candidate or candidates to the output unit 302. In some examples, a user can preconfigure the level of improvement, or only make suggestions for certain contexts of communication (e.g., work, or social media posts), and the candidate generating module selects the most appropriate candidate(s) from the language storage unit 351 according to the configuration stored in a user profile (not shown). In some examples, the candidate generating module 304 has a function applying results of the work of the linguistic element extracting module and models in model storage 352 to the user profile configuration and generating the paraphrase candidate with respect to the inputted communication in real-time. The candidate generating module 304 outputs the generated paraphrase candidate to the Output unit 302.

A paraphrase candidate that is suggested can automatically replace (e.g., if the user configures their user profile to do so) if it is determined that the mood scores are higher for negative moods (annoyed, mad, frustrated, etc.) and/or the scores associated with positive moods are lower than a threshold (e.g., happy, excited).

The storage 350 includes the language storage 351, the model storage 352, and the linguistic library 353. The storage 350 is realized, for example, by storage media such as RAM or the like shown and described in FIG. 7, and stores various types of data such as a control program or the like executed by the paraphrasing module 300. Part of the storage 350 may be realized by ROM, and a control program may be stored in a ROM part. The storage 350 has the function of storing the communication inputted by the user and the paragraphing candidates determined by the models with respect to the communication.

The language storage 351 stores a plurality of communications inputted by the input unit 210, a plurality of paraphrased versions of the communications, the emotional scores of the paraphrased versions and the relationship score for each communication, and the like. The model storage 352 has the function of storing models to be used on received communications, initiating the models, and the like.

In some examples, a breakdown of the moods associated with a communication is displayed to the user. The user can then select a specific mood or moods to see the text associated with it and see alternative phrases to used to change the value of the mood. For example, selecting the "sad" mood could highlight all the words in the text that were used to determine the score of the "sad" mood. This data can be accessed from the language storage unit and presented to the user by output unit 302.

Figure 4:
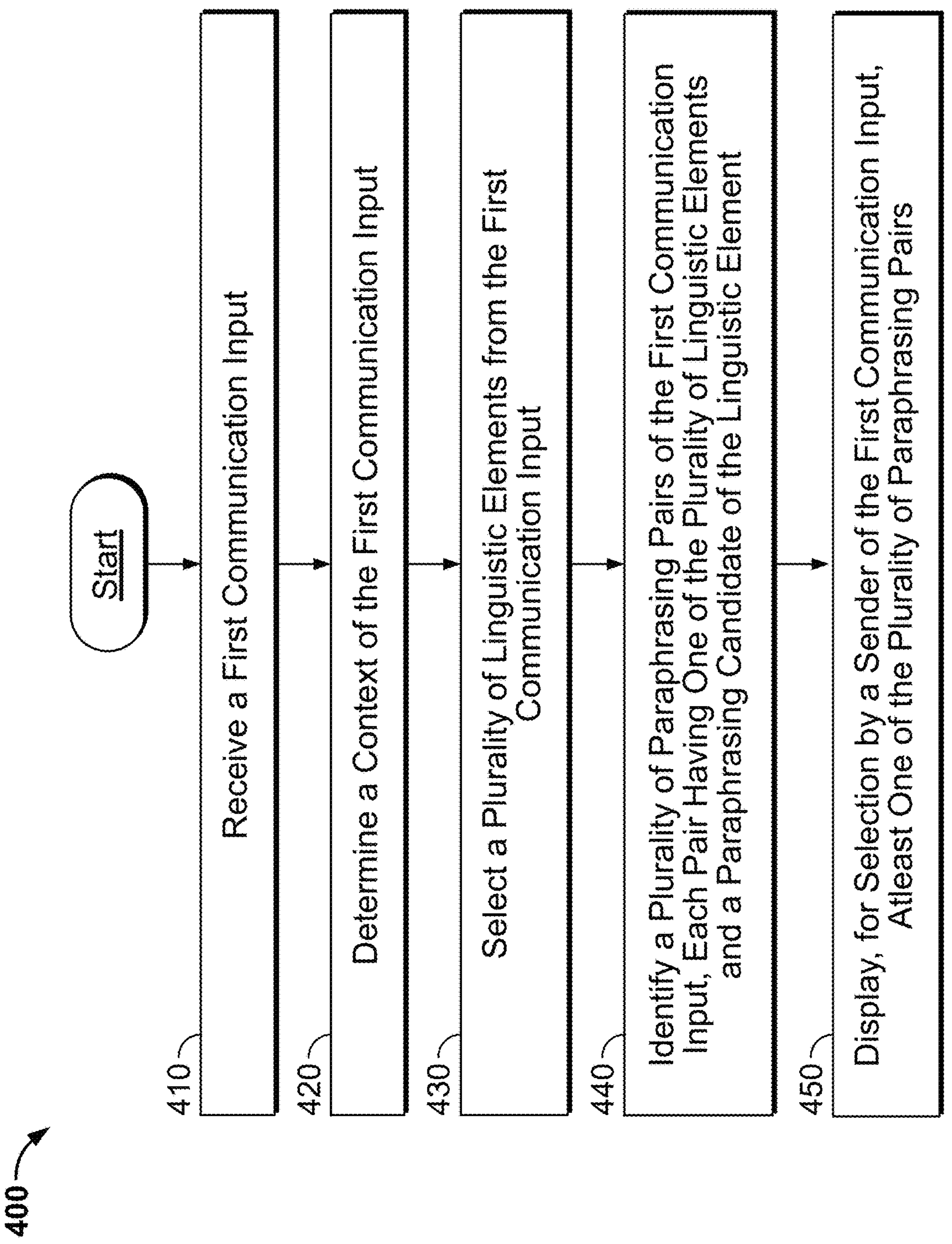
FIG. 4 is an illustrative flowchart of a process for paraphrasing communications, in accordance with some embodiments of the disclosure.

FIG. 4 is an illustrative flowchart of a process for paraphrasing communications, in accordance with some embodiments of the disclosure. It should be noted that process 400 or any step thereof could be performed on, or provided by, any of the devices shown in FIGS. 2 & 3, or FIGS. 6 & 7. In addition, one or more steps of process 400 may be incorporated into or combined with one or more steps of any other process or embodiment (e.g., process 500, FIG. 5), indeed, process 500 may be carried out in parallel to process 400.

At step 410, a first communication input is received. At step 420, the context of the first communication input is determined. For example, the emotional state of the sender, the emotional state of the recipient(s), and the relationship between the sender and the recipient(s) (e.g., colleagues, family, friends, etc.) In some examples, when a user starts to compose a message (e.g., inputs into input 210, or opens an email or messaging application), an emotional analysis module 300 is triggered to detect the user's current emotional state (e.g., happy, sad, mad, frustrated, afraid, etc.). Such data might also be readily available for access by the application. For example, applications might use existing data if recent (based on tagged time) or cause the trigger of a new data collection/emotion analysis.

At step 430, a plurality of linguistic elements from the first communication input is selected. For example, a paraphrasing module 300 may be used to extract linguistic elements and identify paraphrasing pairs, as described above with regard to FIG. 3.

At step 440, a plurality of paraphrasing pairs of the first communication input is identified. Each pair has one of the plurality of linguistic elements and a paraphrasing candidate of the linguistic element. The paraphrasing candidate is a suggestion to the sender, which can be selected to improve the tone, context, emotional sentiment, or emotional reception of the communication. In some examples, the paraphrasing candidate is an emotional synonym or an emotional antonym. An emotional synonym is a phrase used to represent a word or words that convey the same meaning or feeling of the message, but better suits the context in which the user is drafting. For example, the phrase, "Sorry, Bob is sick today" may be suitable for an informal conversation between friends, but at the workplace the phrase, "Apologies, Bob is unwell" might be more suitable, note the latter is also more concise, dropping the term, "today" which may also be more appropriate given the context. An emotional antonym is a phrase used to represent a word or words that improve the sentiment or feeling of the message. For example, the phrase, "you here yet?" may be misconstrued as rude or short over a text message, whereas "hey, where are you?" improves the emotional sentiment of the message, notably by improving the grammar but also by adding the informal greeting, "hey".

At step 450, at least one of the plurality of paraphrasing pairs is displayed for selection by a sender of the first communication input.

Figure 5:
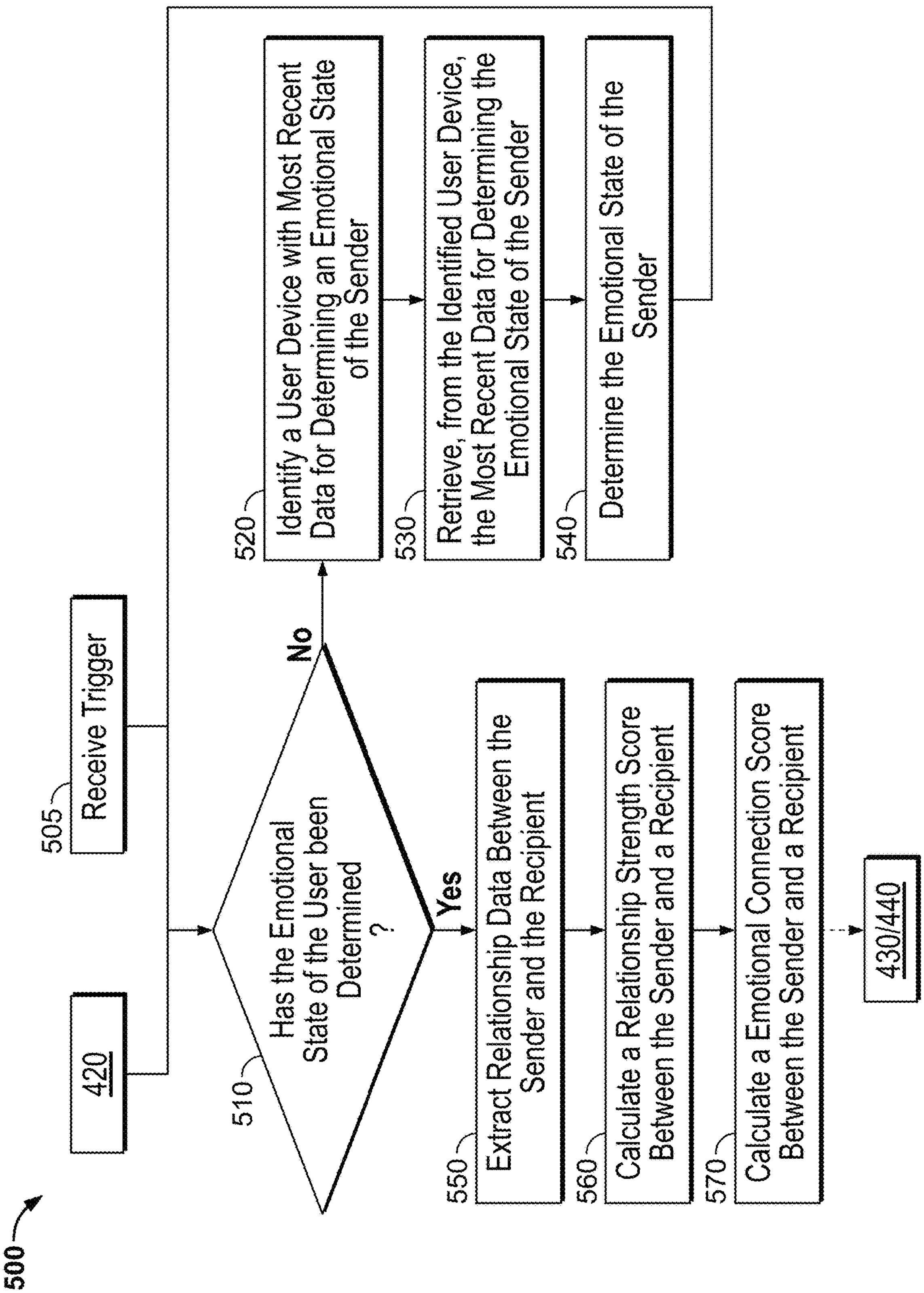
FIG. 5 is an illustrative flowchart of a process for paraphrasing communications, in accordance with some embodiments of the disclosure.

FIG. 5 is an illustrative flowchart of a process for paraphrasing communications, in accordance with some embodiments of the disclosure. It should be noted that process 500 or any step thereof could be performed on, or provided by, any of the devices shown in FIGS. 2 & 3, or FIGS. 6 & 7. In addition, one or more steps of process 500 may be incorporated into or combined with one or more steps of any other process or embodiment (e.g., process 400, FIG. 4), indeed, process 500 may be carried out in parallel to process 400.

Process 500 begins after step 420 of process 400 or at step 505 where a trigger is received. Determining the emotional state of a user can be activated periodically, and therefore process 500 may also be activated periodically. The cause of activation of process 500 is referred to as a trigger. A trigger may be an action or event such as a user unlocking their phone, replying to a message, opening a messaging app, reading a message, by a sudden increase heartrate, and the like. For example, a sender may open an application on their smartphone (such as a messaging, email, or social media application), which can be used as a trigger for determining the emotional state of the sender. Likewise, a recipient may receive an email from the sender and reply sometime later, the trigger would be the time of the replying rather than the time of the receiving of the email. In a further example, the sender may carry out an action, such as recording a voice memo, video, taking a selfie, or the like—which are not themselves a message in the conventional sense, can be sent to convey a message to another. That is to say that, any action, which in some way can be related to a message, e.g., a verbal, written, or recorded communication sent to or left for a recipient.

At step 510, the system determines if the emotional state of the user has been determined or not. If the answer to step 510 is no, process 500 continues to step 520 through step 540. If the answer to step 510 is yes, process 500 continues to step 550 (see below).

At step 520, a user device with the most recent data for determining the emotional state of the sender is identified. At step 530, the most recent data for determining the emotional state of the sender is retrieved from the identified user device For example, the user may have a plurality of devices, such as a smartwatch, smartphone, laptop, and the like; each configured to collect data on the user, which can be used to determine the emotional state of the user. In a particular example, the user may have a smartwatch with heart rate data that is 2 minutes old and smartphone data (e.g., facial analysis data) that is 30 seconds old, therefore the system can use the most recent data for the determination, in response to a trigger as described above. In some examples, the method further comprises determining the emotional state of the user with data from two or more user devices. For example, using a plurality of data points from two or more devices, such as a heart rate from a smartwatch and a facial analysis from a smartphone, the system may determine the emotional state of the user, leading to a more accurate determination.

In some examples, the method further comprises reprocessing data stored on the user device prior to receiving the first communication input, wherein the data was not previously processed for determining the emotional state of the user. Many of the devices available to users record data beyond what is required. For example, a smartwatch records heart rate data for exercise but can also check the data for atrial fibrillation (AFib), a form of irregular heart rhythm, indeed such processing is often carried out after the fact. In another example, it is now common for smartphones to take images of the user's face to authenticate the user to unlock the smartphone or make a transaction. Reprocessing (or parallel processing) such data for the purpose of detecting the emotional state of the user allows the emotional state of the user to be monitored not only when drafting text or speech, but also for receiving text or speech from another user. Accordingly, data previously stored and captured on the user devices can be reprocessed for determining the emotional state of the sender or recipient.

At step 540, the emotional state of the sender is determined. The emotion of a user can be determined by using facial analysis; by use of audio analysis; using computer vision, for posture, gestures, facial expressions, and the like; analysis of the use of language in text or speech, for example, increased use of expletives or punctuation marks. For example, the emotional state of the sender may be determined by facial analysis of the user through a front-facing camera in a user device such as a smartphone or laptop. Similarly, computer vision may be applied to an image or frames of a user to determine their mood or emotional state based on postures or body language. In another example, heart-rate analysis has been shown to be indicative of a user's mood or emotional state, which when combined with a context of location or action, can indicate abnormal mood(s). Furthermore, the language that a user chooses when typing, speaking, or the like, can also be reflective of their emotional state, this can be analyzed by using natural language processing, or the like. After step 540, process 500 reverts back to step 510.

At step 550, relationship data between the sender and the recipient is extracted. (e.g., colleagues, family, friends, etc.) In some examples, relationship data is extracted from at least one of contact information, stored on a user device; a social network profile link; or previous communications.

At step 560, a relationship strength score between the sender and a recipient is calculated. By way of example, relationship strength is an indicator of how close two people are relationship-wise. In some instances, the relationship is already known (e.g., contact name is mom, dad) or known via other means (e.g., a social network profile that explicitly recites that Person A is in a relationship with Person B—Facebook does that). Also, the amount of communication that takes place (e.g., phone calls, text messages, content sharing, etc.) gives a higher value to the relationship strength key. The medium of communication is also used—since two people might exchange emails every day as part of their job. The medium of communication—such as two parties communicating via text, Facetime, Instagram, Snapchat, etc.—can be used to control the relationship strength value. As such, the strength value between two people that communicate via an Outlook application is unlikely to exceed a threshold (this is deemed as a professional relationship).

Additionally, it is worth noting for clarity that as scores between Persons A and B are determined and the scores are associated with the sender and recipient of the message in communication; when Person B replies to a message from Person A, then Person B is considered as the sender and Person A the recipient; the scores are useable for both A and B—in particular the relationship strength score. However, the emotional score may vary hugely (see below), and no assumptions should be made in this regard—in this way, the system can collect granular information with respect to whether Person B is empathetic to Person A (e.g., when the dominant mood in Person A's messages is an annoyance or sadness), etc. A reaction (e.g., such as a thumbs up to a text message sent via iMessage, or a reply to a text message with a happy emoji, etc.) is used to update the connection score associated with a particular mood or mood(s).

At step 570, an emotional connection score between the sender and a recipient is calculated. Calculating the emotional connection score may further comprise summing the scores assigned to one or more factors of communication between the sender and the recipient; and assigning a score to one or more of the communication methods of the first communication input; the language of the first communication input; the periodicity of one or more previous communications; the communication method of one or more previous communications; and the language of one or more previous communications.

The emotional connection score represents a measurement (e.g., numerical) of the various emotions detected when the 2 entities communicate with each other at various times and are dynamic since the value changes as more communication between the two entities occur. Put another way, there could be an emotional communication score associated with the communication that takes place between Person A and Person B, an emotions communication score that represents the relationship between Person A and Person X, etc. The various detected emotions per relationship can therefore be ranked so that the dominant emotion is determined.

It should be understood that different models can be used to compute such scores and no one model may be suitable to get an accurate picture of the complex relationship between users and emotions that users may be feeling at a given time or toward a certain entity (e.g., user or corporation, etc.). For example, when the two entities are communicating via text, then the score is computed by comparing the words in the text against an emotional lexicon. For example, DepecheMood is a model, as described above with reference to FIG. 1, that takes a sentence as an input and output values associated with different moods (anger, excitement, etc.) A video chat can use facial and audio features to determine the various/most dominant moods and update the various scores described earlier, including the connection score (individualized as described earlier).

In some examples, the type of which source to use to obtain data related to the user's emotional state is selected based on the device or devices that the user is using and/or the connection strength between the two entities, and/or the application being used. In some examples, multiple sources can be selected (i.e., results from both sources are used for priority communication.

There are instances where a precise or high degree of accuracy of the emotional state might not be required. For example, a user texting a contact that he or she normally texts multiple times a day, exchanging pictures, links, etc. is an indication that the strength score is high. Therefore, existing data can be utilized to estimate the current emotional state.

For example, if the user is wearing a smartwatch and composing a text or e-mail on his or her phone to a contact with whom he shares a high relationship strength score, then the most recent measurements of the emotional state can be used to predict or determine their emotional state. Such existing recent/fresh data can be used to conserve power since the watch periodically performs its measurements and such recent data can therefore be leveraged. Additionally, recent measurements that were computed using the phone's camera can also be used (i.e., a camera/associated software that reads facial expressions is an example of an emotion recognition mode or type). Another example of emotion recognition mode is the use of ECG data (e.g., most recent) described earlier.

In some examples, recent measurements are not used (unless they fall within a predefined time—e.g., measurements were taken in the last 20 minutes) to determine the user's emotional state at the time he or she is initiating a communication if the relationship strength score is deemed as 'professional' or 'stranger' (not enough data is available to calculate or estimate a strength score). For example, a user that is composing an e-mail to his co-workers might require a high degree of accuracy when it comes to detecting the current user's emotional state. In such case, as the user is composing a work e-mail, data can be collected from multiple devices or multiple modes can be used to determine his or her emotional state (e.g., facial tracking or capturing a frame using the phone or laptop as well as a secondary device, such as a smartwatch with the capabilities described earlier). Therefore, the medium of communication is an indication of what type of model and modality to invoke and how to configure the paraphrasing module 300. Similarly, the model that is selected is based on the relationship strength as well. For example, a "professional" model is selected when communicating with co-workers or initiating business-related communication, "standard" model is selected when communication with contacts with whom a high relationship strength score exists. Such models have their own lexica (pre-built and trained) to suggest alternative words to the user.

After step 570, process 500 reverts to step 430 or 440. By way of explanation, as process 500 may be carried out in parallel to process 400, process 400 may continue with step 430 in parallel to process 500, and therefore process 500 would instead revert to step 440 of process 400 after completion.

The paraphrasing is performed based on the scores associated with the two entities; the relationship strength score, and the current emotional state of the sender. In another embodiment, the current emotional state of the receiver can also be considered. For example, the messaging application might recommend to person A to message Person B based on their relationship score, connection score associated with A, and emotional data related to Person B's moods.

In another example, if Person A is composing a message to Person B to congratulate them on getting a new job, the message might be rephrased such that it is amplified to boost Person B's current emotional state (if it is already known or can be determined). Paraphrasing in this context can convert the word "congrats" to "Nailed it," "way to go," with a congratulatory emoji (e.g., hands clapping), or a by applying different colors to the text or bolding a portion of the text. The term "paraphrasing" encompasses any modification to the text or any supplemental metadata that is added to augment the communication.

In some examples, the method further comprises a recommendation to the sender to postpone sending a communication with a negative sentiment to Sender A, if it is determined that Receiver B's current emotional state is sad or annoyed. For example, if AER for person B has recently taken place and it is determined that person B is in a frustrated or angry mood at work, then as a coworker (person A) begins to email person B about the football game at the weekend the system can suggest to postpone sending such an email until lunchtime, after work, or when person B's mood improves. In such examples, a notification can be made to person A that person B is busy with work right now, rather than state that person B is frustrated or angry.

Figure 6:
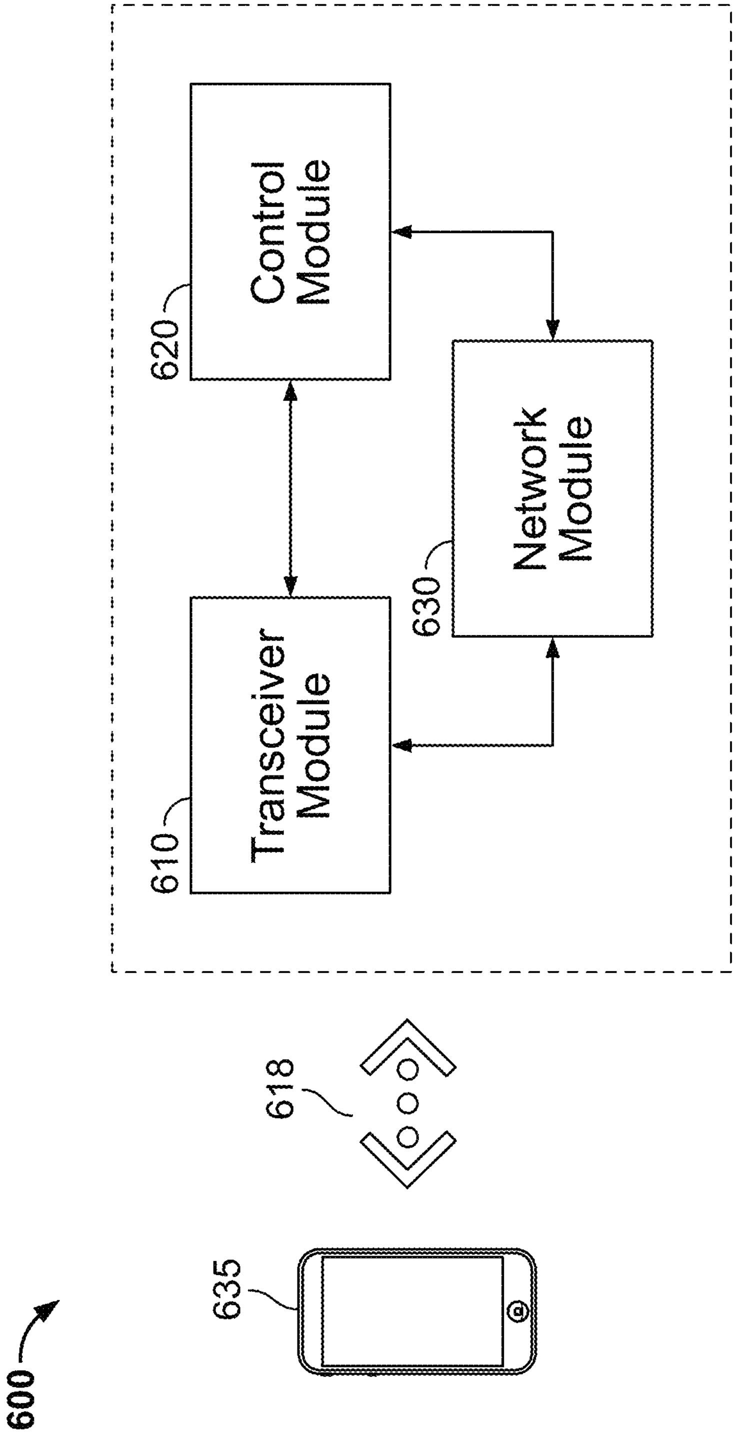
FIG. 6 illustrates an exemplary media transmission device, in accordance with some embodiments of the disclosure.

FIG. 6 illustrates an exemplary media device 600, in accordance with some embodiments of the disclosure. The media device 600 comprises a transceiver module 610, a control module 620, and a network module 630. The media transmission system may communicate with an additional user device 635, such as a home game way, smartphone, Internet of Things (IoT) device video game controller, or other smart devices. In some examples, the additional user device 635 is the user's main device, and the media device 600 comprises the components for carrying out the processing, in particular when the additional user device is limited in processing capabilities.

In some examples, the transceiver module communicates with a second user device 635 via communication link 618. The communication link 618 between the transceiver module 610 and the second user device 635 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the second user device 635 may receive a natural language input (e.g., the first communication between the first user and the second user) and then transmit the natural language input to the media device 600. However, these examples are considered to be non-limiting and other combinations of the features herein being spread over two or more devices are considered within the scope of this disclosure. For example, each of the transceiver module, the network module, and the control module may be separate internet of things (IoT) devices that each carry out a portion of the methods herein. Collectively, these devices may be referred to as a system. In some examples, a natural language input may be stored on a server such as server 702 of FIG. 7, as described below.

In some examples, the transceiver module is configured to: receive a first communication input; and transmit for display at least one of the plurality of paraphrasing pairs. Moreover, the transceiver module may send and receive data collected by the control module suitable to storage or a model for determining the paraphrasing candidates. In some examples, the control module is configured to: determine a context of the first communication input based on the context of the first communication input; select a plurality of linguistic elements from the first communication input; and identify a plurality of paraphrasing pairs of the first communication input, each pair having one of the plurality of linguistic elements and a paraphrasing candidate of the linguistic element. In some examples, the network module is configured to: establish a connection between a storage module (such as storage module 350 of FIG. 3, which may comprise further or separate storage module). The network module and transceiver module may be the same module.

Figure 7:
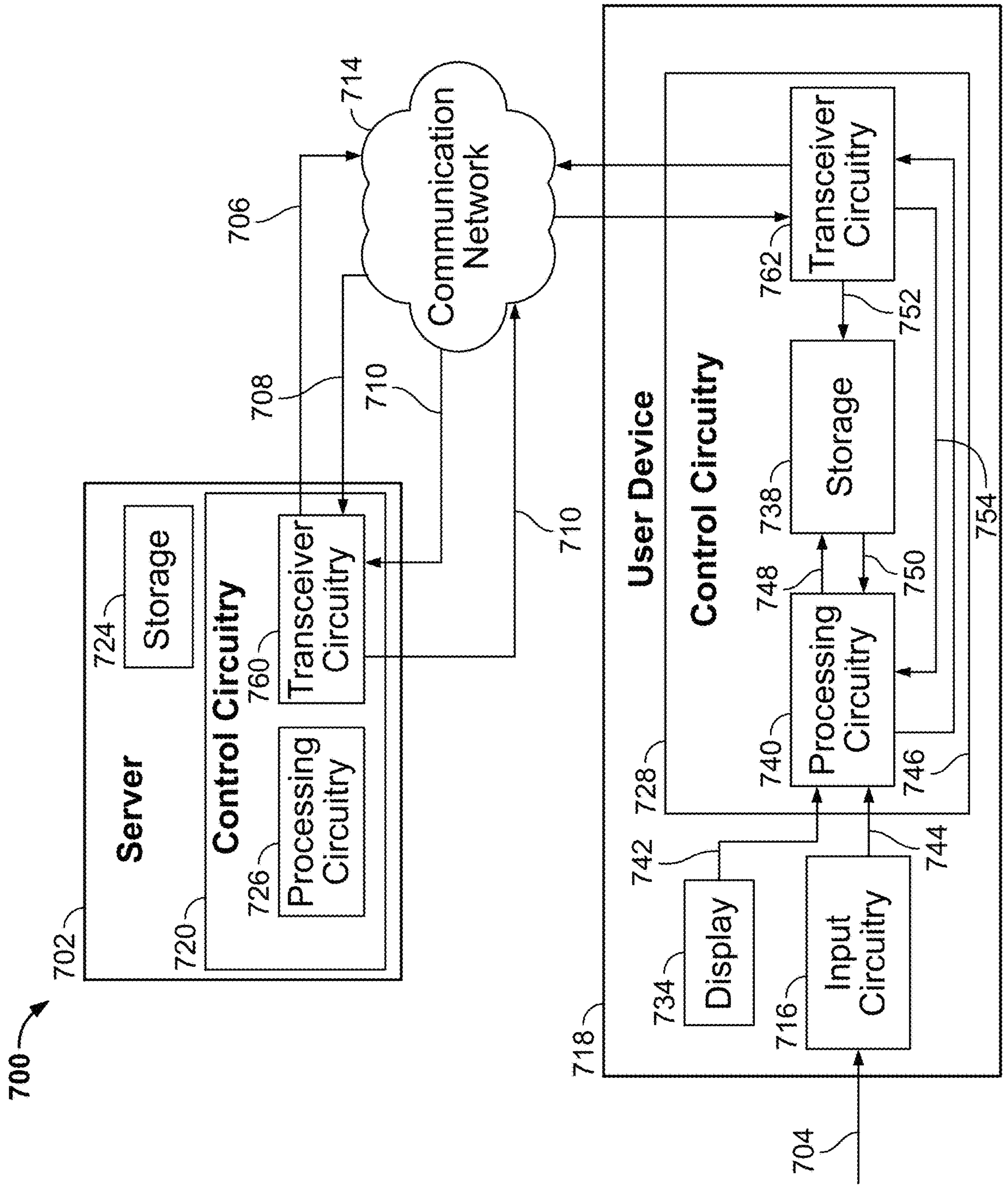
FIG. 7 is a block diagram representing devices, components of each device, and data flow therebetween for a system for paraphrasing communications, in accordance with some embodiments of the disclosure.

FIG. 7 is a block diagram representing devices, components of each device, and data flow therebetween for paraphrasing communications, in accordance with some embodiments of the disclosure. System 700 is shown to include a user device 718, a server 702, and a communication network 714. It is understood that while a single instance of a component may be shown and described relative to FIG. 7, additional instances of the component may be employed. For example, server 702 may include or may be incorporated in, more than one server. Similarly, communication network 714 may include or may be incorporated in, more than one communication network. Server 702 is shown communicatively coupled to user device 718 through communication network 714. While not shown in FIG. 7, server 702 may be directly communicatively coupled to user device 718, for example, in a system absent or bypassing communication network 714. User device 718 may be thought of as the media device 600 or 635, as described above.

Communication network 714 may comprise one or more network systems, such as, without limitation, an internet, LAN, WIFI, or other network systems suitable for audio processing applications. In some embodiments, system 700 excludes server 702, and functionality that would otherwise be implemented by server 702 is instead implemented by other components of system 700, such as one or more components of communication network 714. In still other embodiments, server 702 works in conjunction with one or more components of a communication network 714 to implement certain functionality described herein in a distributed or cooperative manner. Similarly, in some embodiments, system 700 excludes user device 718, and functionality that would otherwise be implemented by the user device 718 is instead implemented by other components of system 700, such as one or more components of communication network 714 or server 702 or a combination. In still other embodiments, the user device 718 works in conjunction with one or more components of communication network 714 or server 702 to implement certain functionality described herein in a distributed or cooperative manner.

The user device 718 includes control circuitry 728, display 734, and input-output circuitry 716. Control circuitry 728, in turn, includes transceiver circuitry 762, storage 738, and processing circuitry 740. In some embodiments, user device 718 or control circuitry 728 may be configured as user device 735 of FIG. 7.

Server 702 includes control circuitry 720 and storage 724. Each of storage 724 and 738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 724, 738 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 724, 738 or instead of storages 724, 738. In some embodiments, the pre-encoded or encoded media content, in accordance with the present disclosure, may be stored on one or more of storages 724, 738.

In some embodiments, control circuitry 720 and/or 728 executes instructions for an application stored on the memory (e.g., storage 724 and/or storage 738). Specifically, control circuitry 720 and/or 728 may be instructed by the application to perform the functions discussed herein. In some implementations, any action performed by control circuitry 720 and/or 728 may be based on instructions received from the application. For example, the application may be implemented as software or a set of executable instructions that may be stored on storage 724 and/or 738 and executed by control circuitry 720 and/or 728. In some embodiments, the application may be a client/server application where only a client application resides on user device 718, and a server application resides on server 702.

The application may be implemented using any suitable architecture. For example, it may be a stand-alone application wholly implemented on user device 718. In such an approach, instructions for the application are stored locally (e.g., in storage 738), and data for use by the application is downloaded periodically (e.g., from an out-of-band feed, from an internet resource, or using another suitable approach). Control circuitry 728 may retrieve instructions for the application from storage 738 and process the instructions to perform the functionality described herein. Based on the processed instructions, control circuitry 728 may determine a type of action to perform in response to input received from the input/output path (or input-output circuitry) 716 or the communication network 714. For example, in response to a receiving a natural language input on the user device 718, control circuitry 728 may perform the steps of processes as described with reference to various examples discussed herein.

In client/server-based embodiments, control circuitry 728 may include communication circuitry suitable for communicating with an application server (e.g., server 702) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 714). In another example of a client/server-based application, control circuitry 728 runs a web browser that interprets web pages provided by a remote server (e.g., server 702). For example, the remote server may store the instructions for the application in a storage device. The remote server may process the stored instructions using circuitry (e.g., control circuitry 728) and/or generate displays. User device 718 may receive the displays generated by the remote server and may display the content of the displays locally via display 734. This way, the processing of the instructions is performed remotely (e.g., by server 702) while the resulting displays, such as the display windows described elsewhere herein, are provided locally on the user device 718. User device 718 may receive inputs from the user via input circuitry 716 and transmit those inputs to the remote server for processing and generating the corresponding displays. Alternatively, user device 718 may receive inputs from the user via input circuitry 716 and process and display the received inputs locally, by control circuitry 728 and display 734, respectively.

It is understood that user device 718 is not limited to the embodiments and methods shown and described herein. In non-limiting examples, the user device 718 may be a television, a Smart TV, a digital storage device, a digital media receiver (DMR), a digital media adapter (DMA), a streaming media device, a personal computer (PC), a laptop computer, a tablet computer, a PC media server, a PC media centre, a handheld computer, a personal digital assistant (PDA), a mobile telephone, a portable gaming machine, a smartphone, a virtual reality headset, an augmented reality headset, a mixed reality headset, or any other device, client equipment, or wireless device, and/or combination of the same capable of engaging with a video game environment.

Control circuitry 720 and/or 718 may be based on any suitable processing circuitry such as processing circuitry 726 and/or 740, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores).

In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 720 and/or control circuitry 718 are configured to implement a video game environment, such as systems, or parts thereof, that perform various processes described herein.

User device 718 receives a user input 704 at input circuitry 716. For example, user device 718 may receive a user input like a user swipe, user touch, or input from peripherals such as a keyboard and mouse, gaming controller, or the like. It is understood that user device 718 is not limited to the embodiments and methods shown and described herein. In non-limiting examples, the user device 718 may be a Smart TV, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, virtual reality headset, mixed reality headset, an augmented reality headset, or any other television equipment, computing equipment, or wireless device, and/or combination of the same.

User input 704 may be received from a user selection-capturing interface that is separate from device 718, such as a remote-control device, trackpad, or any other suitable user movement sensitive or capture devices, or as part of device 718, such as a touchscreen of display 734. Transmission of user input 704 to user device 718 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, 5G, or any other suitable wireless transmission protocol. Input circuitry 716 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, 5G, or other wireless transmission protocols.

Processing circuitry 740 may receive input 704 from input circuit 716. Processing circuitry 740 may convert or translate the received user input 704 that may be in the form of gestures or movement to digital signals. In some embodiments, input circuit 716 performs the translation to digital signals, which are then used in processing. In some embodiments, processing circuitry 740 (or processing circuitry 726, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment appropriately, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for paraphrasing communications, the method comprising:

receiving, from a sender, a first communication input;

determining a context of the first communication input;

determining, based at least in part on the context of the first communication input, an emotional tone of the first communication input;

identifying a sender user device associated with the sender having most recent data for determining an emotional state of the sender;

identifying a recipient user device associated with a recipient having most recent data for determining an emotional state of the recipient;

retrieving, from the identified sender user device, the most recent data for determining the emotional state of the sender;

determining the emotional state of the sender based on the most recent data for determining the emotional state of the sender;

retrieving, from the identified recipient user device, the most recent data for determining the emotional state of the recipient;

determining the emotional state of the recipient based on the most recent data for determining the emotional state of the recipient;

based on the context of the first communication input:

selecting a plurality of linguistic elements from the first communication input;

identifying a plurality of paraphrasing pairs of the first communication input, each pair having one of the plurality of linguistic elements and a paraphrasing candidate of the linguistic element, wherein the paraphrasing candidate is based on the emotional state of the sender and the emotional state of the recipient;

displaying, for selection by the sender, at least one of the plurality of paraphrasing pairs; and based at least in part on the emotional state of the sender, the emotional state of the recipient, and the emotional tone of the first communication input:

displaying, for selection by the sender, a recommendation to postpone a transmission of the paraphrasing candidate.

2. The method of claim 1, determining the emotional state of the sender is based on at least one of: facial analysis; audio analysis; computer vision; heart rate analysis; or analysis of language in the first communication input.

3. The method of claim 1, wherein determining the emotional state of the sender is carried out in response to a trigger.

4. The method of claim 3, wherein the trigger is one of: a timer; an action of the sender; opening an application on a user device; replying to a previous communication; or an increase in heart rate.

5. The method of claim 1, further comprising:

determining the emotional state of the sender with data from two or more user devices.

6. The method of claim 1, further comprising:

reprocessing data stored on the sender user device prior to receiving the first communication input, wherein the data was not previously processed for determining an emotional state of the sender.

7. The method of claim 1, wherein the paraphrasing candidate is an emotional-synonym or an emotional-antonym.

8. The method of claim 1, wherein determining the context of the first communication input comprises calculating a relationship score between the sender and the recipient.

9. The method of claim 8, further comprising:
extracting relationship data between the sender and the recipient from at least one of: contact information, stored on a user device; a social network profile link; or previous communications.

10. The method of claim 8, wherein calculating the relationship score comprises:
summing scores assigned to one or more factors of communication between the sender and the recipient; and
assigning a score to at least one of:
a communication method of the first communication input;
a language of the first communication input;
a periodicity of one or more previous communications;
a communication method of one or more previous communications; and
a language of one or more previous communications.

11. The method of claim 1, wherein determining the context of the first communication input comprises calculating an emotional connection score between the sender and the recipient.

12. The method of claim 11, wherein calculating the emotional connection score comprises:
summing scores assigned to one or more factors of communication between the sender and the recipient; and
assigning a score to at least one of:
a communication method of the first communication input;
a language of the first communication input;
a periodicity of one or more previous communications;
a communication method of one or more previous communications; and
a language of one or more previous communications.

13. The method of claim 8, furthering comprising:
determining, based on the relationship score, if a relationship between the sender and the recipient is one of a professional or a stranger; and
based on a determination that the relationship between the sender and the recipient is one of a professional or a stranger, determining the emotional state of the sender and the emotional state of the recipient further based on a medium of communication.

14. The method of claim 1, wherein the emotional state of the recipient is determined to be negative when it is one of: angry, sad, mad, or annoyed.

15. A non-transitory computer-readable medium, having instructions stored thereon for paraphrasing communications which, when executed, carry out a method, the method comprising:
receiving, from a sender, a first communication input;
determining a context of the first communication input;
determining, based at least in part on the context of the first communication input, an emotional tone of the first communication input;
identifying a sender user device associated with the sender having most recent data for determining an emotional state of the sender;
identifying a recipient user device associated with a recipient having most recent data for determining an emotional state of the recipient;
retrieving, from the identified sender user device, the most recent data for determining the emotional state of the sender;
determining the emotional state of the sender based on the most recent data for determining the emotional state of the sender;
retrieving, from the identified recipient user device, the most recent data for determining the emotional state of the recipient;
determining the emotional state of the recipient based on the most recent data for determining the emotional state of the recipient;
based on the context of the first communication input:
selecting a plurality of linguistic elements from the first communication input;
identifying a plurality of paraphrasing pairs of the first communication input, each pair having one of the plurality of linguistic elements and a paraphrasing candidate of the linguistic element, wherein the paraphrasing candidate is based on the emotional state of the sender and the emotional state of the recipient;
displaying, for selection by the sender, at least one of the plurality of paraphrasing pairs; and
based at least in part on the emotional state of the sender, the emotional state of the recipient, and the emotional tone of the first communication input:
displaying, for selection by the sender, a recommendation to postpone a transmission of the paraphrasing candidate.

16. The computer-readable medium of claim 15, wherein determining the emotional state of the sender is based on at least one of: facial analysis; audio analysis; computer vision; heart rate analysis; or analysis of language in the first communication input.

17. The computer-readable medium of claim 15, wherein determining the emotional state of the sender is carried out in response to a trigger.

18. A device for paraphrasing communications comprising:
a control module;
a transceiver module; and
a network module, wherein the control module is configured to:
receive, from a sender via the transceiver module, a first communication input;
determine a context of the first communication input;
determine, based at least in part on the context of the first communication input, an emotional tone of the first communication input;
identify a sender user device associated with the sender having most recent data for determining an emotional state of the sender;
identify a recipient user device associated with a recipient having most recent data for determining an emotional state of the recipient;
retrieve, from the identified sender user device, the most recent data for determining the emotional state of the sender;
determine the emotional state of the sender based on the most recent data for determining the emotional state of the sender;

retrieve, from the identified recipient user device, the most recent data for determining the emotional state of the recipient;

determine the emotional state of the recipient based on the most recent data for determining the emotional state of the recipient;

based on the context of the first communication input:

select a plurality of linguistic elements from the first communication input;

identify a plurality of paraphrasing pairs of the first communication input, each pair having one of the plurality of linguistic elements and a paraphrasing candidate of the linguistic element, wherein the paraphrasing candidate is based on the emotional state of the sender and the emotional state of the recipient;

display, for selection by the sender of the first communication input, at least one of the plurality of paraphrasing pairs; and based at least in part on the emotional state of the sender, the emotional state of the recipient, and the emotional tone of the first communication input:

display, for selection by the sender, a recommendation to postpone a transmission of the paraphrasing candidate.

* * * * *